United States Patent [19]
Mencacci

[11] 3,788,375
[45] Jan. 29, 1974

[54] EVAPORATOR HAVING MOVING HEAT EXCHANGE TUBES

[75] Inventor: Samuel A. Mencacci, Saratoga, Calif.

[73] Assignee: FMC Corporation, San Jose, Calif.

[22] Filed: Nov. 15, 1972

[21] Appl. No.: 306,946

[52] U.S. Cl............ 159/25 A, 259/8, 259/DIG. 18, 165/92
[51] Int. Cl........ B01d 1/00, B01d 1/30, B01p 7/16, B01f 15/00, F28f
[58] Field of Search.......... 159/25 R, 25 A; 23/285; 165/92, 111; 259/8, 23, 24, 43, 44, DIG. 18; 99/348, 454, 466

[56] References Cited
UNITED STATES PATENTS

| | | | |
|---|---|---|---|
| 289,785 | 12/1883 | Stuart | 159/16 R |
| 421,163 | 2/1890 | Collings | 159/28 R X |
| 1,412,531 | 4/1922 | Kleinschmidt | 159/25 A |
| 1,737,624 | 12/1929 | Thomson | 159/160 X |
| 1,891,705 | 12/1932 | Delas | 159/25 R X |
| 2,274,361 | 2/1942 | Darby | 259/8 X |
| 3,020,025 | 2/1962 | O'Mara | 259/79 |
| 3,319,694 | 5/1967 | Freiday | 159/10 |
| 3,623,548 | 11/1971 | Cook | 165/87 |

Primary Examiner—Jack Sofer
Attorney, Agent, or Firm—F. W. Anderson et al.

[57] ABSTRACT

An evaporator including a processing tank filled with a product to be evaporated. A reel is mounted for rotation within the tank and is formed, in part, of a plurality of spaced heated tubes which provide moving heat exchange surfaces and which, in motion, cavitate at their trailing edges. The heat exchange tubes are each formed with a cross-sectional configuration defining a pocket at the trailing edge thereof which maximizes the area of the cavitational void. Conduits are fixed at the ends of the tubes relative to each cavitation void to continuously evacuate the voids of vapors resulting from the evaporation of the product in the processing tank and to deliver the vapors to a location at one end of the tank where they can be withdrawn.

16 Claims, 4 Drawing Figures

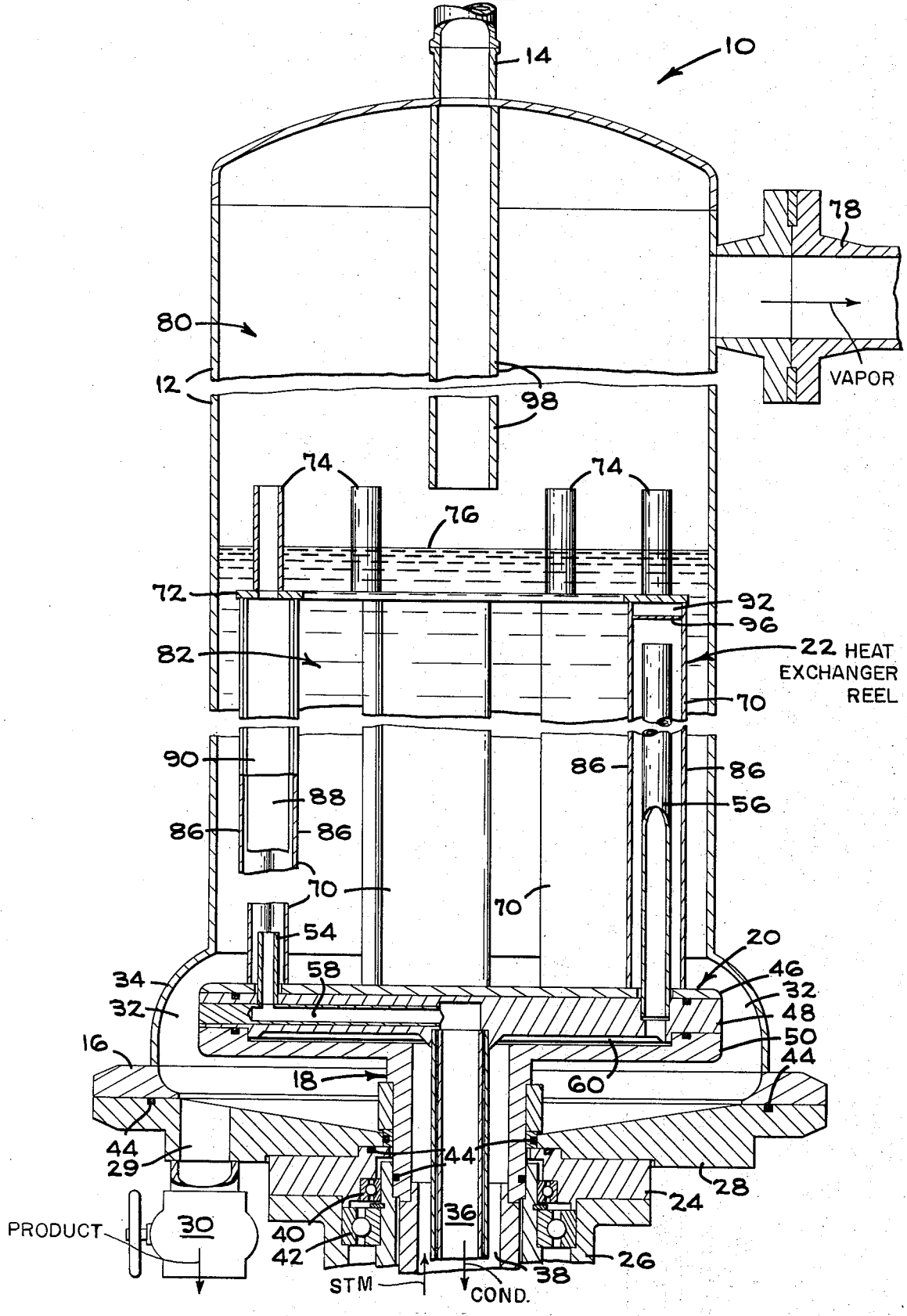

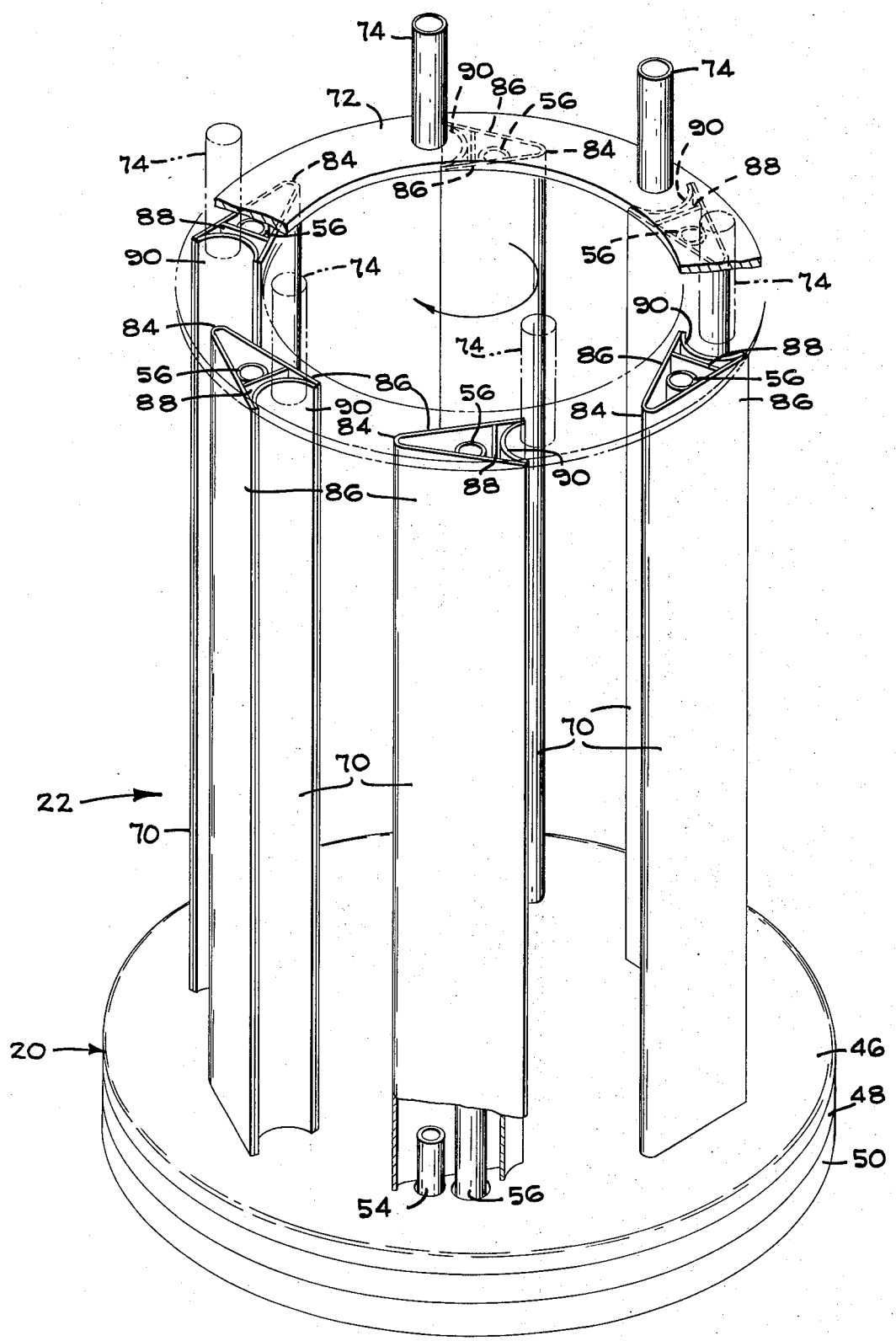

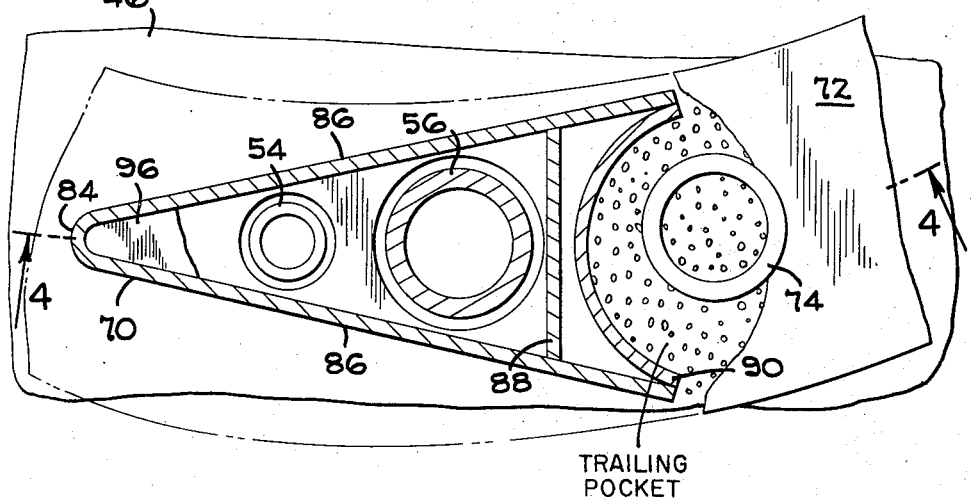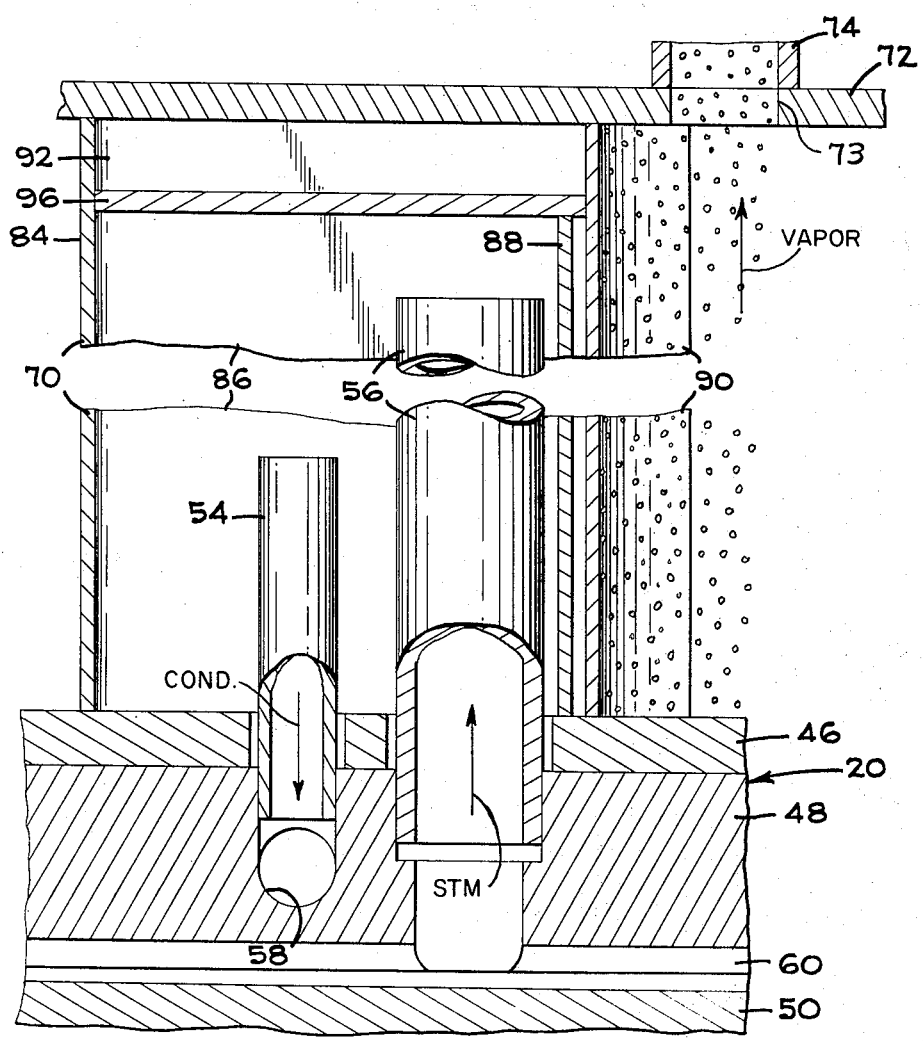

EVAPORATOR HAVING MOVING HEAT EXCHANGE TUBES

BACKGROUND OF THE INVENTION

The present invention is concerned with the field of evaporators for concentrating liquid food products such as fruit juices frozen concentrates, tomato juices for producing canned tomato paste, and various semi-liquid food products for producing baby food purees and the like.

DESCRIPTION OF THE PRIOR ART

Most prior art evaporators comprise stationary structures wherein the product to be concentrated by evaporation is circulated through or around heated tubes or is circulated past a bundle of heated plates. In some prior art evaporators a rotary paddle arrangement has been used to force the product against a heated jacket to obtain evaporation. Recently, some evaporators have been constructed and operated which utilize a rotary heated coil to cause evaporation within a semi-liquid product in an enclosed tank.

The present invention is somewhat related to a co-pending United States patent application of Abbott et al. Ser. No. 159,912, filed July 6, 1971, and having the same assignee as the present invention. The application particularly concerns a heat exchanger having a rotatable reel formed of steam-conducting tubes that have special cross sectional configurations with insulation to inhibit the condition of "burn-on." Burn-on results when the relative movement of the product and the steam heated tubes diminishes to the point where a thin film of the product adheres to a moving tube and is burned. This adversely affects the flavor of the product and may thus necessitate stoppage and cleaning of the heat exchanger at frequent, commercially impractical, intervals.

One objective of the heat exchanger disclosed in the above-identified patent application is the reduction or elimination of cavitation resulting from movement of the heated tubes through the product because cavitation voids are locations wherein the stagnant product can burn on the surface of the tubes. To prevent this condition, the heat exchange tubes were provided with streamlined cross sections. One embodiment disclosed in the prior patent application included a wedge shaped or triangular cross section which produced a trailing cavitational void, but the tube was insulated along the trailing surface thereof specifically to prevent "burn-on" at this location.

Cavitation, to some degree, is inevitable when there is relative movement between a heat exchange tube and a liquid. For example, with viscous tomato paste, a cylindrical tube will cavitate on both the leading and trailing surfaces as it moves through the semi-liquid product. Even a streamlined, symmetrical configuration of tear drop shape will permit burning of the product at each side of the tube where the cross sectional configuration narrows near the trailing edge of the tube. It was realized that a wedge-shaped heat exchange tube having rearwardly diverging side walls (as disclosed in the above-identified Abbott, et al., patent application) offered the best approach to preventing flow separation and a cavitational void at the sides of the tube because the product is constantly deflected. An apparent disadvantage to a wedge-shaped heat exchange tube is that the broad trailing surface of the tube causes cavitation to a marked degree. Burn on, however, can be controlled along the trailing surface of a wedge-shaped heat exchange tube by the inclusion of an interior insulating wall or other insulation means to keep the trailing portion of the tube cool. In other words, cavitation along the trailing edge or base was accepted as a minor disadvantage offset by the advantage of the optimum flow conditions for obtaining efficient heat transfer at the side walls.

SUMMARY OF THE INVENTION

It has now been recognized that the large cavitational areas provided by the heat exchange tubes of the prior art Abbott, et al., patent application can be effectively utilized when such heat exchange tubes are used in an evaporator. With the evaporator of the present invention, a special heat exchange tube is provided which has a cross sectional configuration that provides a pocket at the trailing surface thereof so as to extend the area of the cavitational void produced as the tube is moved at high speeds through the product to be concentrated by evaporation. The cavitational void produced by the movement of the tube should be vertically oriented so as to provide a free unimpeded path for the vapors released from the product.

In a preferred form of the invention a plurality of such heat exchange tubes are arranged at spaced locations in a circular array and are arranged to be rotated about a common vertical axis in a tank containing the product to be evaporated. Means are provided at the top of the tank for removing the vapors, and sPecial tubes may be provided to direct the escaping vapors from the cavitational voids to the top surface of the liquid product in the tank.

It will be apparent from the above remarks, therefore, that the present invention advantageously exploits cavitation in heat exchange tubes for a useful purpose which is in direct contrast to the prior art structures wherein cavitation in heat exchange tubes is either disregarded, tolerated to a limited extent, or purposely avoided.

BRIEF DESCRIPTION OF THE DRAWINGS

FIG. 1 is a diagrammatic, broken section through an evaporator incorporating structure, in accordance with the present invention, for evaporatively concentrating food products.

FIG. 2 is a diagrammatic isometric view, partly broken away, of the rotatable heat exchanger reel used in the evaporator of FIG. 1.

FIG. 3 is an enlarged section through one of the vertical tube assemblies shown in FIG. 2 and includes fragmentary portions of adjacent structure shown in plan.

FIG. 4 is a section taken along line 4-4 of FIG. 3.

DESCRIPTION OF THE PREFERRED EMBODIMENT

With reference to FIG. 1, one form of evaporator 10 which may embody the concepts of the present invention includes a cylindrical shell 12 having a feed inlet conduit 14 at its closed upper end portion and being secured to a base ring 16 at its lower end portion. Concentric with the base ring and extending upwardly into the processing tank defined by the shell 12 is a rotatable, multi-part column 18. The upper end of column 18 is secured to and supports a circular table 20. An integral part of the table 20 is a heat exchange reel 22

(see also FIG. 2) which, in operation of the evaporator 10, is continuously rotated by means (not shown) connected to the column 18. The particular construction of the various parts of the reel 22 forms an important part of the present invention as will later become evident.

With more specific reference to the details of the structure shown in FIG. 1, the main support for the evaporator 10 will be seen to include a tubular pedestal 24, an annulus 26 attached to and depending from the pedestal, and an apertured circular base plate 28 supported by the pedestal—the whole structure being interconnected by bolts, not shown. The base plate 28 is secured to the base ring 16 at its outer periphery and therefore supports the shell 12 of the evaporator.

The downwardly sloping upper surface of the base plate 28 forms the lower end of the processing chamber, and a passage 29, which includes a valve 30, communicates with the chamber for drawing off the finished concentrate product that gravitates through an annular passage 32 at the lower end of the chamber defined by the outer periphery of the table 20 and a bell end 34 of the shell 12.

The detailed internal construction of the column 18 is not critical to the present invention. It is preferred, however, that it be formed so as to provide a condensate outlet passage 36 and a concentric steam inlet passage 38, both of which are in communication with individual passages in the table 20, as will be presently described. The various seal rings and bearings required in the support column and the surrounding structure, such as the axial and radial thrust support bearings 40 and 42 and the various interface seal rings 44, will be evident to those skilled in the art.

The table 20 may conveniently be constructed of three stacked segments 46, 48 and 50 which are provided with grooves or passages to provide a means to transmit condensate to the condensate outlet passage 36 and steam from the steam inlet passage 38. Thus, the upper segment 46 of the table 20 is in the form of a circular plate having clearance apertures for circumferential arrays of condensate tubes 54 and steam heating tubes 56. Each steam heating or condensate tube has a lower end threaded into the central circular table segment 48. In the case of the condensate tubes 54, each tube communicates with a radial passage 58 in table segment 48 that leads to a central bore in communication with the condensate outlet passage 36. Each steam heating tube 56 communicates with an annular chamber 60, provided by a recess in the upper face of the lower table segment 50 and a corresponding recess in the lower face of table segment 48. The chamber 60 intersects the steam inlet passage 38 to transmit steam of the various tubes 56.

As indicated in FIG. 2, the tubes 54 and 56 are arranged in pairs with apertures in the upper segment 46 of the table 20 providing clearance for the tubes. Each pair of tubes, above the upper table segment, communicates with the interior of a closed heat exchange tube 70. As illustrated, a circumferential array of six heat exchange tubes are provided, but the number of tubes is not significant except with regard to the design parameters of a specific installation. The upper ends of the heat exchange tubes 70 (FIGS. 2 and 4) are connected to a ring 72 which contains vapor passages 73. The ring also mounts a vapor vent tube 74 adjacent to and in fluid communication with the trailing edge of each heat exchange tube 70.

As shown in FIG. 1, each vapor vent tube 74 is arranged to extend upwardly beyond the level 76 of the product being processed in the shell 12 and is, therefore, in direct communication with a vapor outlet pipe 78 located near the upper end of the shell 12. The space defined by the shell 12 above the product level 76 is a vapor expansion chamber 80 where heated vapors may be drawn off through the vapor outlet 78. The similar space below the level 76 (which is occupied by the product to be concentrated) is a heat exchange or evaporation chamber 82 wherein steam fed into the moving heat exchange tubes 70 by the steam inlet tubes 56 provides rapid heat transfer to the product.

Each heat exchange tube 70 (FIGS. 2-4) is formed of a sheet metal panel bent to have a small radius, curved leading edge 84 and rearwardly diverging side walls 86 which may be planar and of equal length or slightly concave and of unequal length. The former construction is preferred for ease of fabrication. An insulating wall 88 interconnects the side walls 86 to confine the heat supplied by the steam heating tube 56 forward of the trailing edges of the side walls 86 and thus make these trailing edges cooler than the forward portions thereof. The trailing edge of each side wall 86 is welded to a concave wall 90 which forms the rear surface of the heat exchange tube.

Due to the broad trailing surface of each heat exchange tube 70, a cavitation void forms adjacent to the concave wall 90 when the reel 22 is in motion. The purpose of having the wall 90 concave, or of similar contour indented toward the leading edge 84, is to provide a pocket which extends the maximum cross sectional area for the cavitation void which develops during operation, i.e., during movement of the tube through the product. The intent is to provide room for full development of the trailing edge cavitational void behind each heat exchange tube 70, such cavitating zone being indicated in FIGS. 3 and 4 by vapor bubbles.

Cavitation results from a reduction of total pressure and causes a low pressure cavity to form and fill with the vapors that are evaporated from the surrounding liquid. If the cavity collapses, large impulse pressures result which can cause mechanical damage and the pitting of adjacent structural surfaces. Thus, in the field of rotary heat exchangers and evaporators, cavitation has previously been a condition to avoid, or to tolerate, rather than a condition to actively encourage. In the present case maximum area is provided for the cavitational voids to develop and movement of the tubes through the product is constant thereby inhibiting collapse of the voids. The vapor vent tubes 74 are located with respect to the cavitational voids (FIG. 4) to provide for continuous evacuation of the buoyant vapors from the voids. In this way, the cummulative and constant vapor transfer provides a relatively rapid concentration of the product being evaporated.

As shown in FIG. 1, the upper interior and portion 92 of each cavitating heat exchange tube 70 is below the product level 76 and is defined by a transverse wall 96 within the tube, the purpose of which is to provide a heat barrier that blocks most of the heat from the steam rising in the steam tube 56 and prevents it from heating the ring 72 and the vapor vent tubes 74. Since the ring and vapor vent tubes are by this means kept relatively cool, there is little danger of "burn-on" occurring at or near the surface of the product. The heat barrier wall 96 is especially important for this reason particularly because the moving vapor vent tubes 74, being cylindrical, will develop both leading and trailing voids with little relative flow. It will be noted that the heat barrier walls 96 have been omitted in FIG. 2 to show the interior construction of the heat exchange tubes which would otherwise be concealed.

Another feature of the heat exchange tubes 70 (FIG. 3) is that the walls 86 constantly diverge from the leading edge 84 of the tube. The resultant flow pattern therefore causes the product to always be deflected outwardly on both sides of thP tubes 70 thus establishing effective heat-transfer contact and assuring that the flowing product will not p5rmit a thin film of the product to remain static on the walls to be burned.

It should also be mentioned that the surfaces of the heat exchange tubes 70 can be insulated, either externally or internally, so as to reduce the heat in any areas which may present "burn-on" problems. It has been found that Teflon-impregnated glass cloth, sheet lead, and other materials which are thermally less conductive than the heat exchange tubes can effectively reduce the temperature in localized zones of the tubes.

It operation, the evaporator 10 (FIG. 1) is filled to the liquid level 76 through the inlet conduit 14 and through an extension conduit 98 thereof which deposits the incoming product centrally of the heat exchange reel 22. The reel is set in motion, clockwise as shown by the directiOnal arrow in FIG. 2, and steam is admitted through the passage 38 and 60 to rise through each steam tube 56. Any air which is initially in the steam passages will escape downward through the hollow heat exchanGe tubes 70 and out of the evaporator through the individual lower condensate tubes 54 and the passages 58 and 36. Counterflow of the steam in the hollow heat exchange tubes follows the aforedescribed air-purging, and the tubes, because of their thin wall construction, rapidly attain the operating temperature. As the tubes are rapidly moved through the product, the temperature of the product will be raised and evaPoratiOn will occur in the chamber 82 at the cavitational voids as previously pointed out.

When the product is sufficiently heated, the vapors rise into the vapor expansion chamber 80. More importantly, the vapors within the cavitation voids at the trailing surface 90 of each heat exchange tube 70 are unimpeded and rise in a positive flow of relatively large volume to be directed into the vapor expansion chamber 80 through the vapor vent tubes 74. This flow iS further enhanced because the vapor outlet 78 is conventionally connected to a vacuum producing means, not shown, which continuously evacuates the chamber 80.

It will be appreciated that the continuous evacuation of the vapor in the cavitational voids at the trailing surfaces of the heat exchange tubes 70 causes a continuous cumulative vapor collection of large volume thus rapidly concentrating the product in the chamber 82. At the same time, the positive flow of vapors from the cavitating voids prevents collection and condensation of the vapors on the concave walls 90 of the tubes and thereby eliminates the detrimental effects of burn on which can impair the flavor of the concentrated product and require frequent cleaning of the tubes. It will also be apparent that the moving heat exchange surfaces defined by the diverging walls 86 provide highly efficient heat transfer and also inhibit burn on because of the continuous relative movement between the walls 86 and the product. The evaporator of the present invention will be particularly efficient with concentrated products which have a high viscosity, such as tomato Condensed vapors from the cavitational voids collect at the base portions of the hollow heat exchange tubes 70 and will bleed off through the condensate tubes 54 and the passages 58 and 36.

The concentrate can be processed in batches, or, with the proper contrOls, can be carried out in a continuous process by periodically admitting raw product through the inlet conduit 14 and drawing off the concentrated product through the output valve 30.

The construction of the heat exchange tubes 70 also makes it possible to closely control the temperature of the concave walls 90 at the trailing ends of the tubes, if desired. For this purpose, the insulating chamber defined by the concave wall 90 (FIG. 3) and the heat insulating wall 88 can be supplied with water from a passage, not shown, extending through the table 20 to maintain the temperature of the wall 90 safely below the temperature of the steam but above the temperature of the product to prevent condensation thereon. For example, when concentrating tomato paste with the tube 70 heated by steam about 260° F., the walls 90 may be maintained at about 135° F. by introducing water into the passage between the walls 88 and 90.

It should also be mentioned that for large evaporators there can be several of the reel assemblies 22 present within the enclosed processing tank all spaced from each other.

Although the best mode contemplated for carrying out the present invention has been herein shown and described, it will be apparent that modification and variation may be made without departing from what is regarded to the subject matter of the invention.

What is claimed is:

1. An evaporator including a tank for containing a product to be evaporatively concentrated, a vertically axised driven reel in said tank including a plurality of spaced internally heated heat exchange tubes, means for passing heat exchange fluid into and out of said tubes, and means for rotating said reel to provide a plurality of spaced heat exchange surfaces moving through the product, each of said heat exchange tubes having a trailing wall configuration providing a pocket which extends the cross sectional area of the downstream cavitational void resulting from the movement of the tubes through the product.

2. Apparatus according to claim 1 wherein each of said heat exchange tubes is of wedge-shaped cross sectional profile formed by side wall panels diverging from a narrow leading edge, said trailing wall configuration comprising a transverse inwardly offset trailing wall interconnecting the trailing end portions of said side walls to close said tube.

3. Apparatus according to claim 2 wherein said trailing wall in each of said tubes is convex toward said leading edge of the tube.

4. Apparatus according to claim 3 wherein the lateral edges of said convex wall in each of said tubes terminate at the trailing edges of said side walls.

5. Apparatus according to claim 4 including an insulating wall in each of said tubes interconnecting said side wall panels forward of said convex wall, and a steam inlet tube mounted to provide steam within the hollow heating space defined by said side walls forward of said insulating wall and said insulating wall, said convex wall thereby being thermally isolated from the steam by said insulating wall.

6. Apparatus according to claim 1 wherein said reel includes a table rotatable about an upright axis, said heat exchange tubes extending upwardly from said table in a circular array, a connecting ring closing the upper ends of said heat exchange tubes, condensate passages in said table having a common outlet and communication with the interior of each of said heat exchange tubes, steam passages in said table having a common inlet and communication with the interior of each of said heat exchange tubes, and means for directing steam to said steam passages to heat said tubes.

7. Apparatus according to claim 6 wherein each of said heat exchange tubes includes a steam inlet tube connected to the associated steam passage and terminating just below said connecting ring, and a transverse insulating wall closing the upper end portion of each heat exchange tube intermediate the upper end of the steam inlet tube and said connecting ring to thermally isolate said connecting ring from the steam.

8. Apparatus according to claim 6 including a plurality of vapor passages in said connecting ring aligned with the trailing pockets formed by each of said heat exchange tubes for removing the vapors formed in said cavitational voids.

9. Apparatus according to claim 8 wherein the product level in said tank is maintained above said connecting ring, and a plurality of vapor outlet tubes aligned with said vapor passages in the ring and extending upwardly above the level of the product in the tank.

10. An evaporator including a tube supported and arranged to be moved through a liqueform material to be concentrated, said tube comprising thin metal walls defining a hollow enclosure having a generally wedge-shaped cross section with a narrow leading edge and a wide trailing wall, said trailing wall being indented toward said leading edge and coextensive and parallel therewith to provide a pocket which extends the cavitational void at the trailing edge of said tube, and means for circulating a heated fluid through the hollow interior of said tube.

11. An evaporator according to claim 10 wherein said indented trailing wall is transversely arcuate.

12. An evaporator according to claim 10 wherein said tube includes a secondary tube provided at the distal end from said support thereof in alignment with said pocket for directing the vapors formed within the cavitational void at the trailing surface of the tube away from the product.

13. An evaporator comprising a tank, an elongate reel in said tank including axially spaced opposite end members, a circular array of heat exchange tubes connected between said end members, each tube having an indented trailing wall formed to provide a pocket to extend the cavitational void produced during rotational movement of the tubes through a liquid material in the tank, and means for circulating a heated fluid through said heat exchange tubes.

14. An evaporator comprising a tank for holding a liquid material to be concentrated, a heat exchange tube mounted in a generally vertical position in said tank, means for directing a heated fluid to the interior of said heat exchanger tube, means for moving said heat exchange tube through said tank to heat the product therein, said tube having a cross sectional configuration such that the trailing wall thereof defines an inwardly extending pocket which extends the area of the cavitational void produced by the movement of the tube through the material, said cavitational void being relatively large to permit the vapors from said material to move unimpeded to the upper end of said tank, and means at said upper end of the tank for permitting the removal of said vapors from the tank.

15. An evaporator as set forth in claim 14 including a vapor escape tube connected to said heat exchange tube at the upper end thereof in vertical axial alignment with said cavitational void produced during movement of the heat exchange tube through said material, the upper level of the material in the tank being adapted to be maintained above the upper end of said heat exchange tube but below the upper end of said vapor escape tube.

16. An evaporator as set forth in claim 14 including a plurality of said heat exchange tubes arranged in spaced positions in a circular array, said means for moving said tube comprising a rotatable mounting means for rotating said tubes about a common vertical axis.

* * * * *

UNITED STATES PATENT OFFICE
CERTIFICATE OF CORRECTION

PATENT NO. : 3,788,375
DATED : January 29, 1974
INVENTOR(S) : SAMUEL A. MENCACCI It is certified that error appears in the above-identified patent and that said Letters Patent are hereby corrected as shown below:

Column 1, line 8: after "juices" insert --for producing--.

Column 3, line 54: change "of" to --to--.

Column 4, line 59: change "and" to --end--.

Column 5, line 9: after "Another" insert --important--;

line 13: change "thP" to --the--;

line 15: change "p5rmit" to --permit--;

line 31: change "passage" to --passages--.

Column 6, line 5: after "tomato" insert --paste--.

Column 5, line 25, "It" should read -- In --.

Signed and sealed this 24th day of June 1975.

(SEAL)
Attest:

RUTH C. MASON
Attesting Officer

C. MARSHALL DANN
Commissioner of Patents
and Trademarks